US005635996A

United States Patent [19]
Okamura

[11] Patent Number: 5,635,996
[45] Date of Patent: Jun. 3, 1997

[54] MEMORY APPARATUS FOR CHANNEL SELECTOR OF TELEVISION RECEIVER

[75] Inventor: Masahiko Okamura, Osaka, Japan

[73] Assignee: Matsushita Electric Industrial Co., Ltd., Kadoma, Japan

[21] Appl. No.: 427,113

[22] Filed: Apr. 21, 1995

[30] Foreign Application Priority Data

Apr. 25, 1994 [JP] Japan .................................. 6-086761

[51] Int. Cl.⁶ ..................................................... H04N 5/50
[52] U.S. Cl. ........................ 348/732; 348/570; 348/731; 455/185.1
[58] Field of Search ................................. 348/731, 732, 348/734, 716, 718, 563, 564, 906, 569, 570; 455/185.1, 186.1, 158.5; H04N 5/50

[56] References Cited

U.S. PATENT DOCUMENTS

| 4,527,144 | 7/1985 | Sirazi ............................. 348/731 |
| 4,959,720 | 9/1990 | Duffield et al. ................... 349/731 |
| 5,373,324 | 12/1994 | Kuroda et al. .................. 348/468 |
| 5,408,692 | 4/1995 | Suzuki et al. .................. 455/186.1 |

FOREIGN PATENT DOCUMENTS

| 64-59505 | 3/1989 | Japan ............................. G05B 15/02 |
| 3-62742 | 3/1991 | Japan ............................. H04N 5/44 |
| 4-122179 | 4/1992 | Japan ............................. H04N 5/445 |
| 4122179 | 4/1992 | Japan ............................. H04N 5/445 |
| 2026799 | 2/1980 | United Kingdom ............... 455/186.1 |

Primary Examiner—John K. Peng
Assistant Examiner—Jeffrey S. Murrell
Attorney, Agent, or Firm—Ratner & Prestia

[57] ABSTRACT

A memory device for channel selection in a television receiver comprises a nonvolatile memory for storing at least one set of channel data and channel attendant data, and a RAM having a channel data storing part which accesses and stores all channel data stored in the nonvolatile memory. When a read tuning command is given, the nonvolatile memory is accessed in order to search addresses of the channel attendant data if a specified channel exists in the RAM. When no specified channel data exists in the RAM, the nonvolatile memory is not accessed.

3 Claims, 4 Drawing Sheets

MEMORY APPARATUS FOR CHANNEL SELECTOR OF TELEVISION RECEIVER

FIELD OF THE INVENTION

The present invention relates to a memory apparatus for channel selector of a television (TV) receiver and a community antenna television (hereinafter called CATV) converter.

BACKGROUND OF THE INVENTION

A channel selecting circuit used in a TV receiver and a CATV converter has a memory apparatus. In the memory apparatus, channel attendant data of each channel including channel skip data, fine tuning data, caption data for displaying a tuned channel number or a name of tuned broadcasting station, etc. are stored.

FIG. 4 illustrates a conventional channel selecting circuit for displaying caption data. The caption data is stored in memory 925. A tuning command having channel data and mode information is supplied to channel selecting circuit 921 from input means 928. The channel data, for instance, specifies a tuned channel with a channel number, and the mode information shows which mode the specified channel belongs to, TV mode or CATV mode. Judging circuit 924 in microcomputer 922 determines whether the specified channel belongs to TV mode or CATV mode based on the mode information. Operating circuit 923 accesses a TV domain 926 of the memory and reads caption data stored therein when the specified channel belongs to TV mode. Operating circuit 923 accesses CATV domain 927 of the memory and reads caption data therein when the specified channel belongs to CATV mode. The accessed caption data is fed to caption processing circuit 914. Regardless of the caption data being stored in the memory or not, operating circuit 923 accesses memory 925 every time the tuning command is fed. The accessed caption data is converted into a caption video signal in caption processing circuit 914, and is fed to a cathode ray tube (hereinafter called CRT) 907 across video signal amplifier 905. Operating circuit 923 also generates a local oscillation controlling signal based on fed channel data, and supplies the signal to tuner 902. Tuner 902 mixes a local oscillating signal of the frequency specified by the local oscillation controlling signal with a TV radio frequency (hereinafter called RF) signal fed from antenna 901. Intermediate frequency (hereinafter called IF) amplifier 903 converts a TV RF signal into an IF signal and also functions as a detector. After detection, the signal is separated into a sound signal and a video signal. The sound signal is supplied to speaker 906 across sound signal amplifier 904. The video signal is supplied to CRT 907 across video signal amplifier 905. The video signal is displayed on CRT 907 by superimposing a caption thereon.

Operating circuit 923, as above described, accesses the memory every time a tuning command is fed, regardless of whether or not the caption data is being stored in the memory. This access, when the caption data is not stored in the memory, is useless and wastes time which deteriorates the response quality of a tuning processing circuit. In order to avoid wasting time, it has been proposed that the channel data and caption data be stored in a random access memory (hereinafter called RAM) of microcomputer 922. However, in most cases, the capacity of RAM is insufficient for this purpose, which proves that this proposal is impractical. According to the present invention, as explained in detail later, the memory device is not accessed when the channel attendant data, including caption data, does not exist. Also according to the present invention, the channel attendant data is not stored in a RAM of a microcomputer while channel data is stored therein. An insufficient RAM capacity thus does not occur.

SUMMARY OF THE INVENTION

The present invention relates to a memory device for channel selection in a TV receiver comprising:

(a) a nonvolatile memory for storing at least one set of channel data and channel attendant data, (b) a RAM having a channel data storing part, which accesses and stores all channel data stored in the nonvolatile memory.

When a read tuning command is given, a read address search means, which corresponds to operating circuit 923 in the prior art described above, accesses the nonvolatile memory in order to search addresses of the channel attendant data if a specified channel exists in the RAM. When no specified channel data exists in the RAM, the read address search means does not access the nonvolatile memory, which avoids wasting time.

A memory device of a second exemplary embodiment according to the present invention further has a writing means for the channel attendant data.

A memory apparatus of a third exemplary embodiment according to the present invention has a display means for displaying the read channel attendant data onto a CRT.

BRIEF DESCRIPTION OF THE DRAWINGS

The invention is best understood from the following detailed description when read with the accompanying drawings, in which.

DETAILED DESCRIPTION OF THE INVENTION

First Exemplary Embodiment

Figure 1:
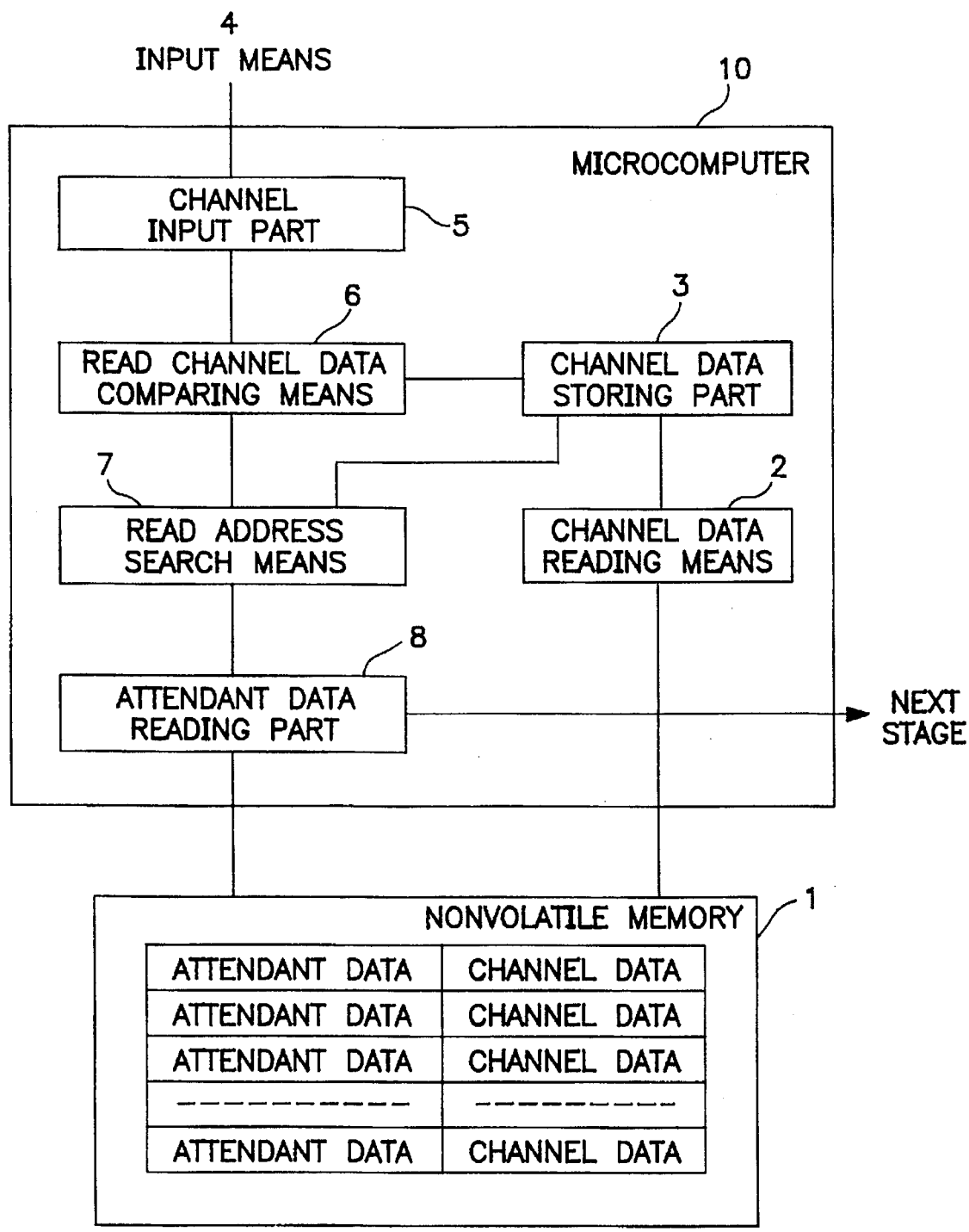
FIG. 1 illustrates a block diagram of a memory apparatus of a first exemplary embodiment according to the present invention.

FIG. 1 illustrates a block diagram of a memory device of a first exemplary embodiment according to the present invention. In nonvolatile memory 1, a set of channel data and channel attendant data is stored. In this exemplary embodiment, a reading operation of the channel attendant data stored in nonvolatile memory 1 is explained.

First, a reset input is fed to microcomputer 10. During a short period of time between starting the reset and beginning receipt of input from inputting means 4 of microcomputer 10, channel data reading means 2 reads the channel data from nonvolatile memory 1 and stores the channel data into channel data storing part 3 in a RAM. The RAM is included in microcomputer 10. The channel attendant data is not stored in the channel data storing part 3.

Second, a tuning command for reading is given. Channel data specified by the tuning command for reading is fed from input means 4 to channel input part 5. Read channel data comparing means 6 judges 'YES' when the specified channel data is stored in channel data storing part 3, and judges 'NO' when the specified data is not stored there.

When a 'NO' judgment is given, read address search means 7 does not access nonvolatile memory 1 for reading the channel attendant data, which saves time wasted on unnecessary access. When a 'YES' judgment is given, read address search means 7 accesses nonvolatile memory 1 in order to search the address of the channel attendant data which composes one set together with the specified channel data. The searched address is supplied to attendant data reading part 8. Attendant data reading part 8 reads the channel attendant data by using the supplied address, and supplies the data to a next stage.

Second Exemplary Embodiment

Figure 2:
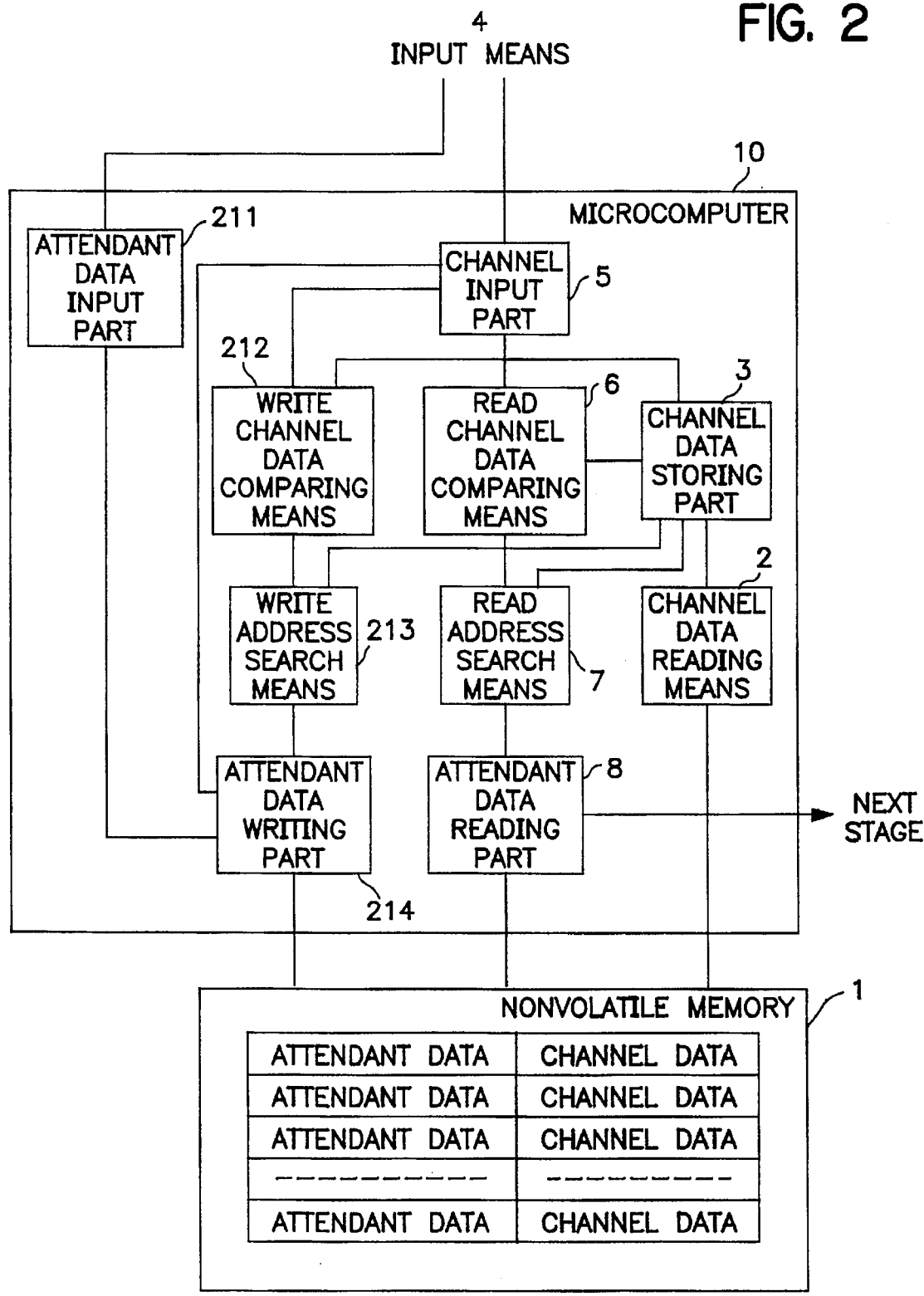
FIG. 2 illustrates a block diagram of a memory apparatus of a second exemplary embodiment according to the present invention.

FIG. 2 illustrates a block diagram of a memory device of a second exemplary embodiment according to the present invention. In addition to reading the channel attendant data as explained in the first exemplary embodiment, the second exemplary embodiment makes it possible to modify or write the channel attendant data in the nonvolatile memory. Since the reading operation of the channel attendant data is the same as that of the first exemplary embodiment, only a modifying or writing operation is explained in this second exemplary embodiment.

First, a reset input is fed to microcomputer 10. During a short period of time between starting the reset and beginning receipt of input from input means 4 of microcomputer 10, channel data reading means 2 reads the channel data from nonvolatile memory 1 and stores the channel data into channel data storing part 3 in the RAM.

Second, a tuning command for writing is given. Channel data specified by the tuning command for writing is fed from input means 4 to channel input part 5. At the same time, new channel attendant data for modifying or writing is fed into attendant data input part 211. Write channel data comparing means 212 judges 'YES' when a specified data is stored in channel data storing part 3, and judges 'NO' when the specified data is not stored there. When a 'YES' judgment is given, write address search means 213 accesses nonvolatile memory 1 in order to search the address of the channel attendant data which composes one set together with the specified channel data. Attendant data writing part 214 writes the new channel attendant data into the searched address, and thereby the channel attendant data is modified. When a 'NO' judgment is given, write address search means 213 accesses nonvolatile memory 1 in order to search a vacant address in the memory. Attendant data writing part 214 writes a set of this new channel data and channel attendant data into the searched address.

Third Exemplary Embodiment

Figure 3:
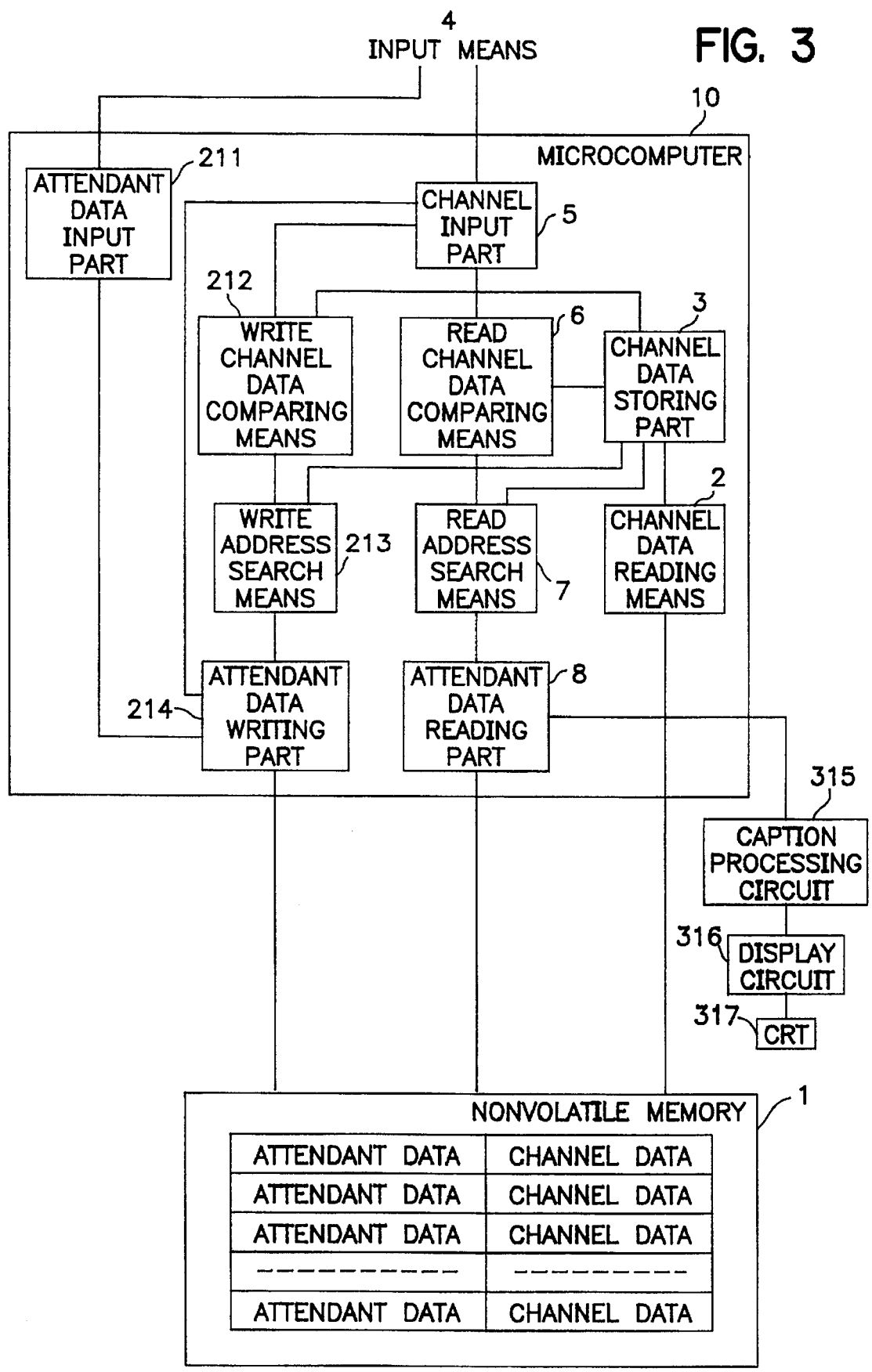
FIG. 3 illustrates a block diagram of a memory apparatus of a third exemplary embodiment according to the present invention.

FIG. 3 illustrates a block diagram of a memory device according to a third exemplary embodiment of the present invention. In this third exemplary embodiment, a display means for displaying read caption data in channel attendant data is added to the second exemplary embodiment. Attendant data reading part 8 supplies the caption data included in the channel attendant data which was read out, to caption processing circuit 315, where the caption data is converted into a caption signal. The caption signal is overlaid on a video signal in display circuit 316, and displayed on CRT 317.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

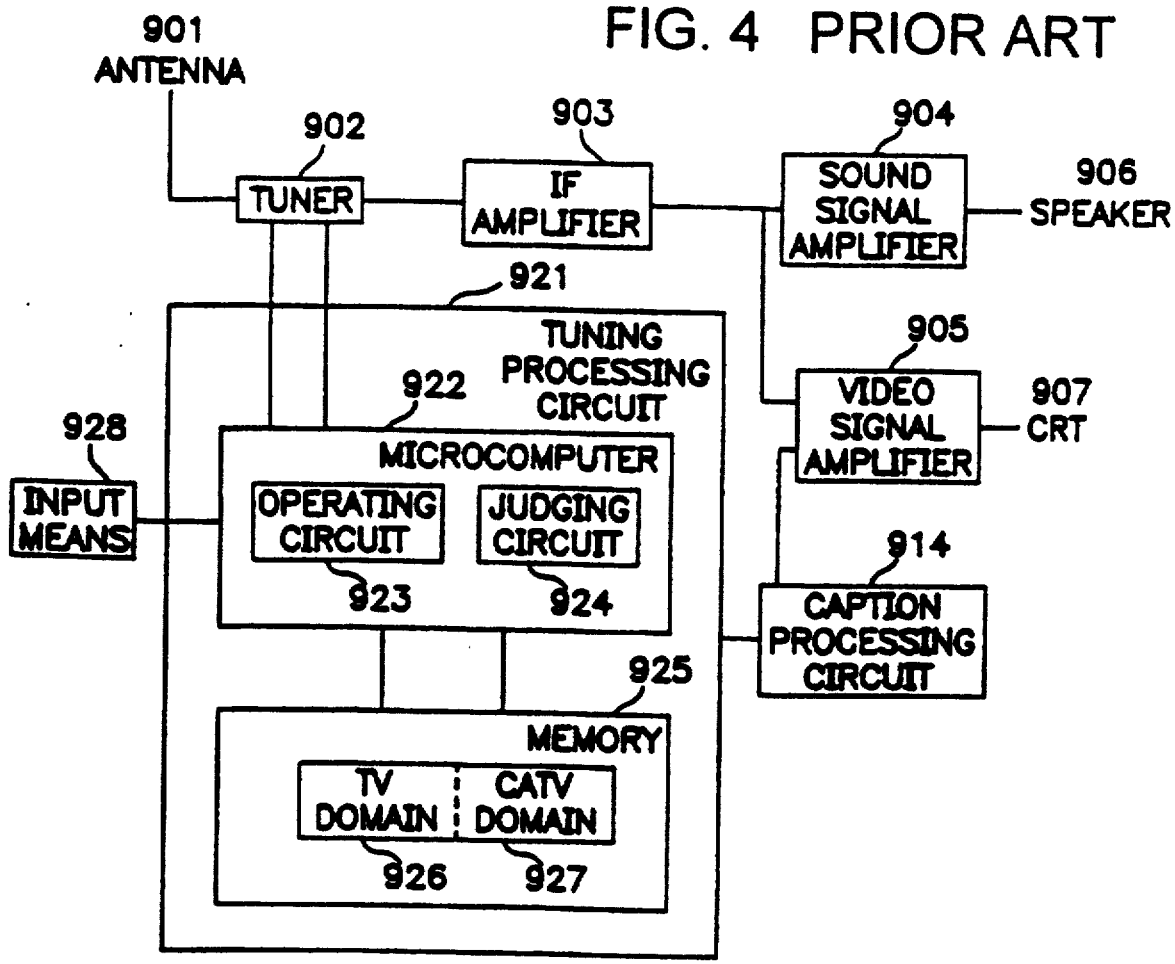

What is claimed:

1. A memory apparatus for channel selection in a television receiver comprising:

a nonvolatile memory containing a plurality of memory locations each identified by a respective address value, wherein a) a channel data value identifying a channel and containing a channel attendant data address value is stored in a first memory location corresponding to a first address value, and b) a channel attendant data value corresponding to said identified channel is stored in a second memory location corresponding to said channel attendant data address value;

memory means for holding data values;

channel data reading means for reading the channel data value from the nonvolatile memory and storing the channel data value in said memory means;

read channel data comparing means for determining if an input channel data value is stored in said memory means;

read address search means for accessing said first memory location of said nonvolatile memory to retrieve said channel attendant data address value of said channel attendant data value, if said input channel data value is determined by said read channel data comparing means to be stored in said memory means; and an attendant data reading part for reading said channel attendant data value in said second memory location of said nonvolatile memory at the channel attendant data address value retrieved by said read address search means.

2. The memory apparatus of claim 1, further comprising:

write channel data comparing means for determining if a further input channel data value is stored in said memory means;

write address search means for accessing a further memory location of said plurality of memory locations of said nonvolatile memory to retrieve a further address value of said nonvolatile memory at which to write a further channel attendant data value, if said further input channel data value is determined by said write channel data comparing means to be located in said memory means; and an attendant data writing part for writing said further channel attendant data value into said nonvolatile memory at said further address value retrieved by said write address search means.

3. The memory apparatus of claim 1, further comprising;

display means for displaying the channel attendant data value read by said attendant data reading part onto a cathode ray tube.

* * * * *

UNITED STATES PATENT AND TRADEMARK OFFICE
CERTIFICATE OF CORRECTION

PATENT NO. : 5,635,996
DATED : June 3, 1997
INVENTOR(S) : Okamura

It is certified that error appears in the above-identified patent and that said Letters Patent is hereby corrected as shown below:

<u>In the Drawing:</u>

Figure 4:
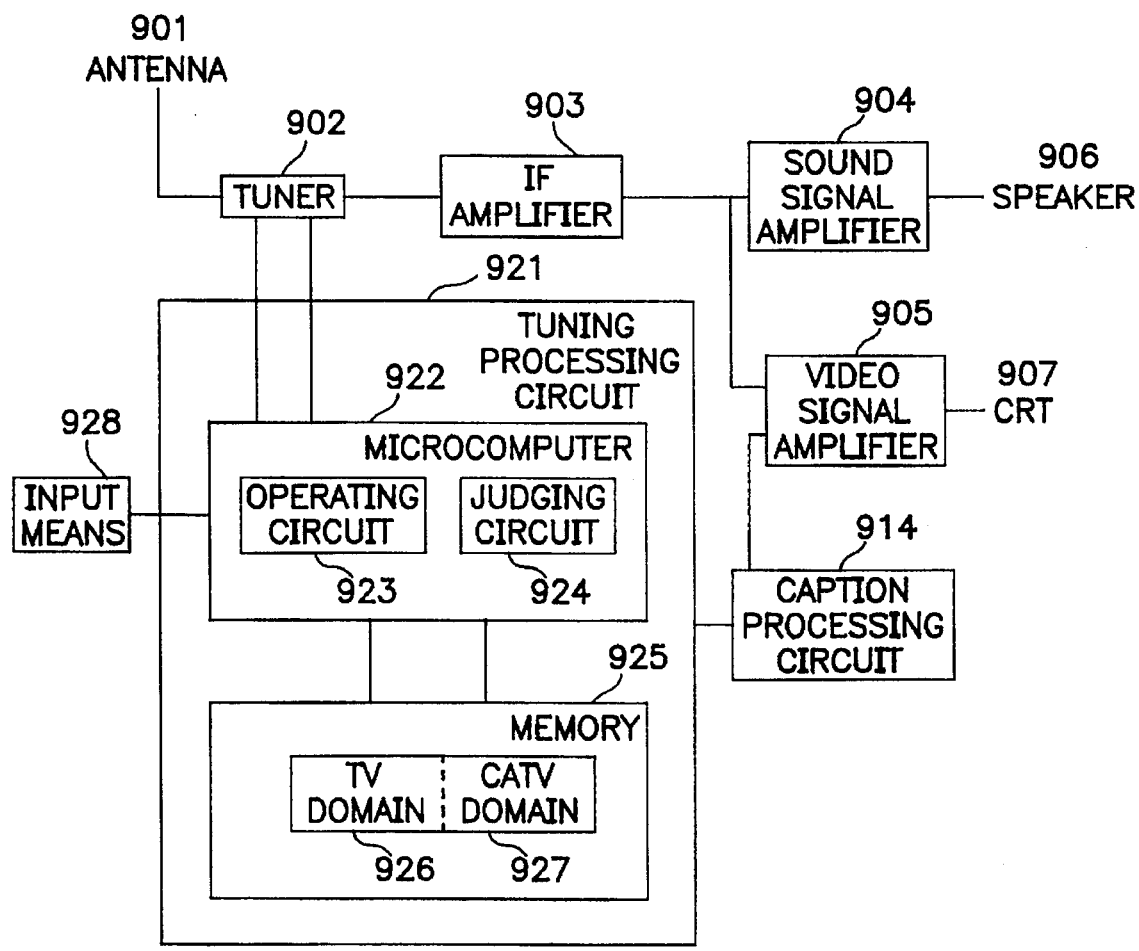
FIG. 4 illustrates a conventional tuning apparatus for displaying caption data.

Delete Drawing Sheet 4, and substitute therefor the Drawing Sheet, consisting of FIG. 4, as shown on the attached pages.

Signed and Sealed this

Sixth Day of January, 1998

Attest:

BRUCE LEHMAN

Attesting Officer

Commissioner of Patents and Trademarks